(12) United States Patent
Bershof

(10) Patent No.: US 12,281,028 B2
(45) Date of Patent: Apr. 22, 2025

(54) WATER FILTER MEDIUM CONTAINER

(71) Applicant: GREEN THINGS, LLC, Denver, CO (US)

(72) Inventor: Judith A. Bershof, Denver, CO (US)

(73) Assignee: GREEN THINGS, LLC, Denver, CO (US)

( * ) Notice: Subject to any disclaimer, the term of this patent is extended or adjusted under 35 U.S.C. 154(b) by 0 days.

(21) Appl. No.: 17/127,788

(22) Filed: Dec. 18, 2020

(65) Prior Publication Data
US 2022/0194815 A1  Jun. 23, 2022

(51) Int. Cl.
| C02F 1/00 | (2023.01) |
| B01D 24/12 | (2006.01) |
| B01D 24/40 | (2006.01) |
| B01D 35/30 | (2006.01) |
| B01D 39/06 | (2006.01) |

(52) U.S. Cl.
CPC .............. *C02F 1/003* (2013.01); *B01D 24/12* (2013.01); *B01D 24/402* (2013.01); *B01D 35/308* (2013.01); *B01D 39/06* (2013.01); *B01D 2101/02* (2013.01); *B01D 2201/302* (2013.01); *B01D 2201/304* (2013.01); *C02F 2307/04* (2013.01)

(58) Field of Classification Search
CPC ...... C02F 1/003; C02F 2307/04; B01D 24/12; B01D 24/402; B01D 35/308; B01D 39/06; B01D 2101/02; B01D 2201/302; B01D 2201/304
See application file for complete search history.

(56) References Cited

U.S. PATENT DOCUMENTS

| 3,733,267 | A | * | 5/1973 | Haase ................ B01D 53/0431 210/669 |
| 8,216,465 | B2 | | 7/2012 | Nauta |
| 10,196,282 | B2 | | 2/2019 | Boudreau et al. |
| 10,702,853 | B2 | | 7/2020 | Mazzoccoli et al. |
| 2002/0043495 | A1 | * | 4/2002 | Beard .................... B01D 27/06 210/501 |
| 2005/0161394 | A1 | * | 7/2005 | Fritze .................... B01D 27/08 210/232 |
| 2010/0044291 | A1 | | 2/2010 | Tseng |

(Continued)

FOREIGN PATENT DOCUMENTS

| CN | 110102102 A | 8/2019 |
| CN | 209668800 U | * 11/2019 |

(Continued)

OTHER PUBLICATIONS

Machine generated translation of KR 20110040725 A (Year: 2011).*

(Continued)

*Primary Examiner* — Magali P Slawski
*Assistant Examiner* — Bernadette Karen McGann
(74) *Attorney, Agent, or Firm* — Dorsey & Whitney LLP

(57) ABSTRACT

A water filter medium container includes a removable upper cover and a removable lower cover. The container includes a tube defining a filter medium compartment operative to receive a replaceable filter medium. A first containment element may be placed between the upper cover and the tube. A second containment element may be placed between the lower cover and the tube. The water filter medium container may be adapted to be placed in a water container.

25 Claims, 13 Drawing Sheets

(56) References Cited

U.S. PATENT DOCUMENTS

| | | |
|---|---|---|
| 2011/0073551 A1 | 3/2011 | Reid et al. |
| 2012/0061312 A1 | 3/2012 | Busick et al. |
| 2014/0144829 A1* | 5/2014 | Takeda .................. B01D 61/18 |
| | | 210/295 |
| 2017/0007949 A1 | 1/2017 | Mayo |
| 2019/0031529 A1* | 1/2019 | DeAngelo ............... C02F 1/283 |
| 2019/0345039 A1 | 11/2019 | Anderson |
| 2019/0376615 A1* | 12/2019 | Becroft .................. E03C 1/041 |
| 2020/0247700 A1 | 8/2020 | Genin et al. |
| 2020/0384387 A1* | 12/2020 | Nehlen, III ............ B01D 29/52 |

FOREIGN PATENT DOCUMENTS

| | | | | |
|---|---|---|---|---|
| EP | 2311777 A1 * | 4/2011 | ............. | A47G 19/12 |
| EP | 2604578 A1 * | 6/2013 | ............. | B01D 35/02 |
| KR | 20110040725 A * | 4/2011 | | |
| WO | WO-2014089211 A1 * | 6/2014 | ............. | B01D 23/02 |

OTHER PUBLICATIONS

Machine generated translation of CN 209668800 U (Year: 2019).*
Howe, Kerry J. Hand, David W. Crittenden, John C. Trussell, R. Rhodes Tchobanoglous, George. (2012). Principles of Water Treatment—7.1.2 Underdrains. John Wiley & Sons. Retrieved from https://app.knovel.com/hotlink/pdf/id:kt00CR4BI9/ principles-water-treatment/underdrains (Year: 2012).*
PCT International Search Report and Written Opinion, mailed Mar. 9, 2022, for PCT Application No. PCT/2021/063986, 9 pages.
European Patent Office, "Communication & Supplementary European Search Report," mailed Oct. 11, 2024, in European Application No. 21907876.3, 8 pages.

* cited by examiner

WATER FILTER MEDIUM CONTAINER

BACKGROUND

The quality of drinking water is a concern in many places in the world, even in developed countries. One way to improve drinking water quality is with a water filter. For example, filter pitchers have been developed that include an upper compartment configured to receive unfiltered tap water. A water filter is in communication between the upper compartment and a lower compartment configured to receive filtered water. Water placed in the upper compartment feeds by gravity through the filter to the lower compartment. As the water passes through the filter, a filter medium in the filter removes or reduces odors and/or contaminants such as volatile organic compounds, pharmaceuticals, phosphate, chlorine and its byproducts, pesticides, and others. However, such filters have a limited lifetime and are single use, throw-away devices that are discarded after use thereby creating landfill waste. It is desirable to have a water filter that can be re-used when the filter medium in the filter is spent.

The information included in this Background section of the specification, including any references cited herein and any description or discussion thereof, is included for technical reference purposes only and is not to be regarded subject matter by which the scope of the invention as defined in the claims is to be bound.

BRIEF SUMMARY

In one aspect, a water filter medium container includes an upper removable cover including a first main body with one or more inlet apertures formed therethrough and forming an upper receptacle therein, a lower removable cover including second main body with an outlet aperture therethrough and forming a lower receptacle therein, and a filter medium assembly operable to contain a filter medium. The filter medium assembly includes a tube having an inlet and an outlet with a filter medium compartment formed therebetween, a first containment element defining a plurality of apertures therethrough received proximate to the inlet of the tube, and a second containment element defining a plurality of apertures therethrough received proximate to the outlet of the tube. A first portion of the tube is received in the upper receptacle and the upper cover secures the first containment element with the tube. A second portion of the tube is received in the lower receptacle and the lower cover secures the other of the second containment element with the tube.

A system is disclosed including a water filter medium container, a filter medium, and a water container. The water container includes an unfiltered water compartment, a filtered water compartment, and a receiver in fluid communication between the unfiltered water compartment and the filtered water compartment. The receiver is operative to receive the water filter medium container such that a fluid placed in the unfiltered water compartment passes through the water filter medium container and the filter medium to the filtered water compartment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

BRIEF DESCRIPTION OF THE SEVERAL VIEWS OF THE DRAWINGS

The disclosure will be readily understood by the following detailed description in conjunction with the accompanying drawings, wherein like reference numerals designate like structural elements.

The use of cross-hatching or shading in the accompanying figures is generally provided to clarify the boundaries between adjacent elements, e.g., when shown in cross section, and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

Figure 1A:
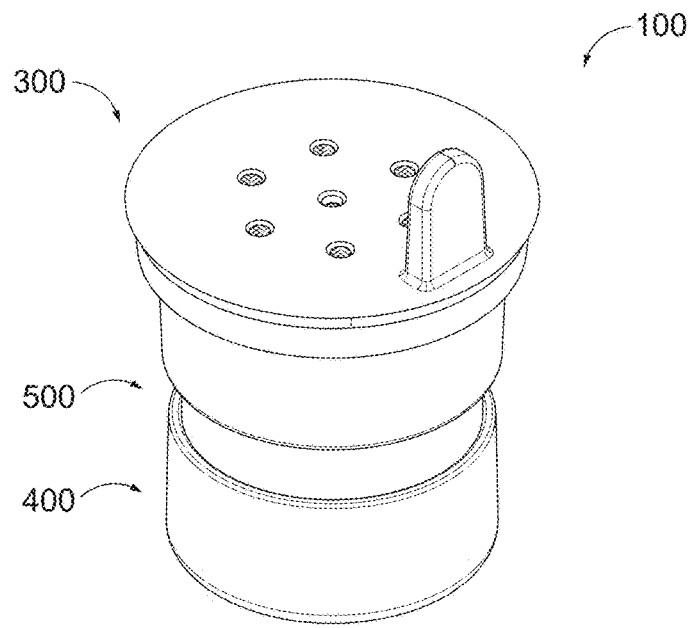

FIG. 1A is an isometric view of a water filter.

Figure 1B:
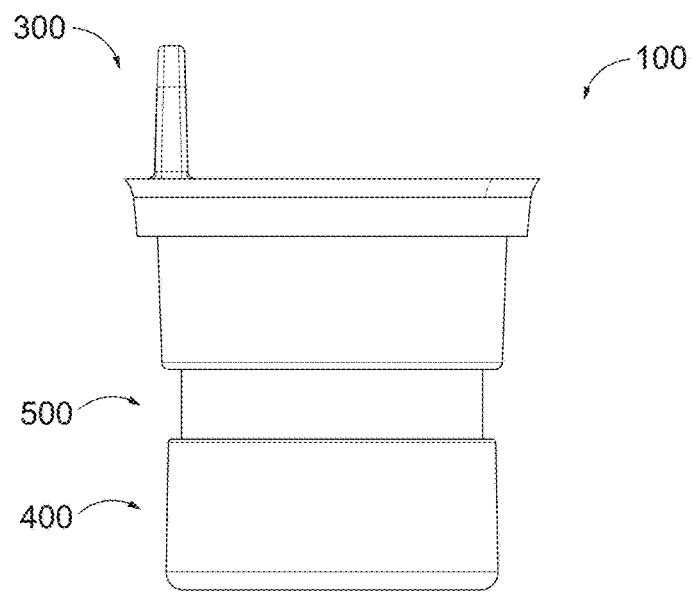

FIG. 1B is a side elevation view of the water filter of FIG. 1A.

Figure 2:
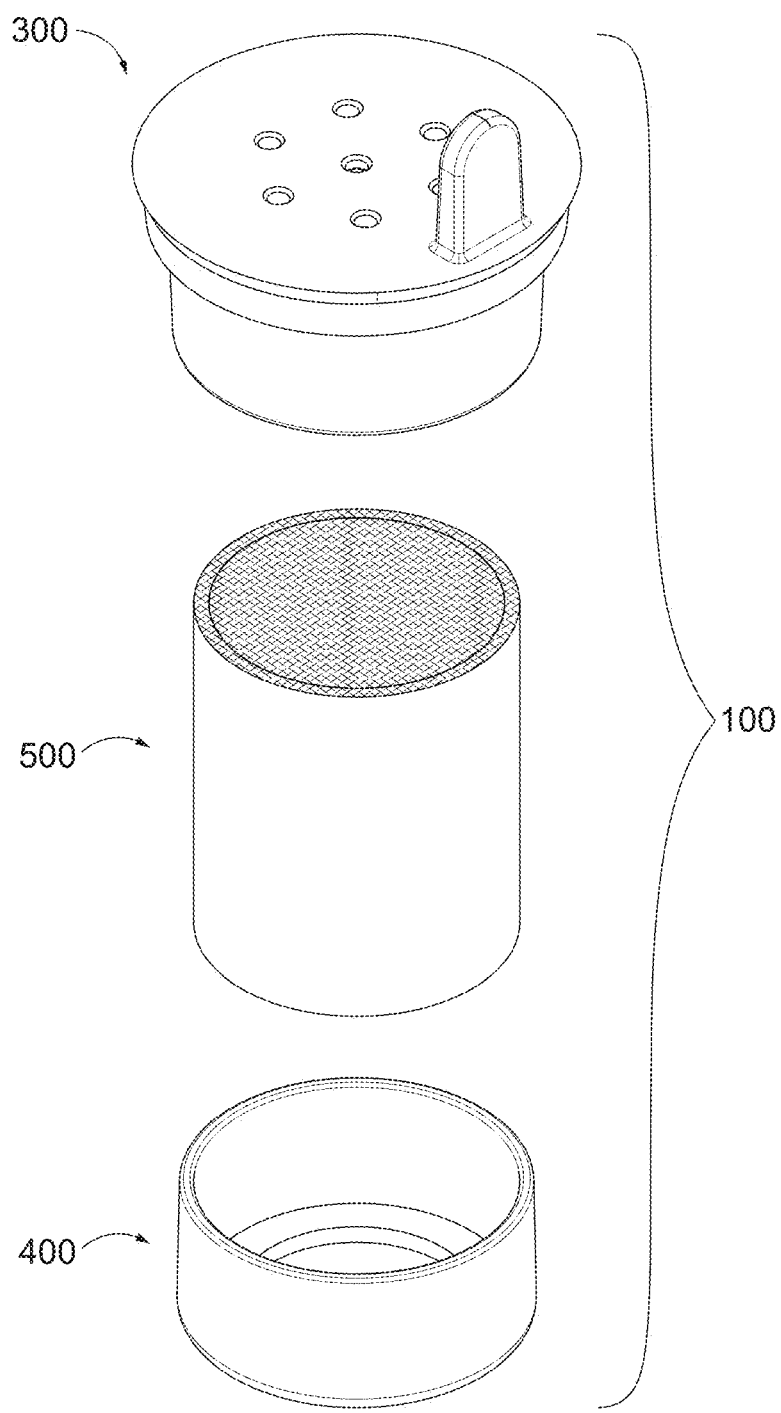

FIG. 2 is an exploded isometric view of the filter of FIG. 1A.

Figure 3A:
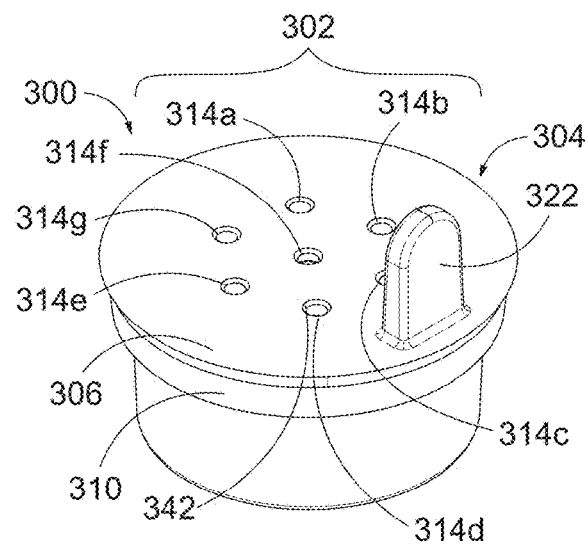

FIG. 3A is a top isometric view of an upper cover of the filter of FIG. 1A.

Figure 3B:
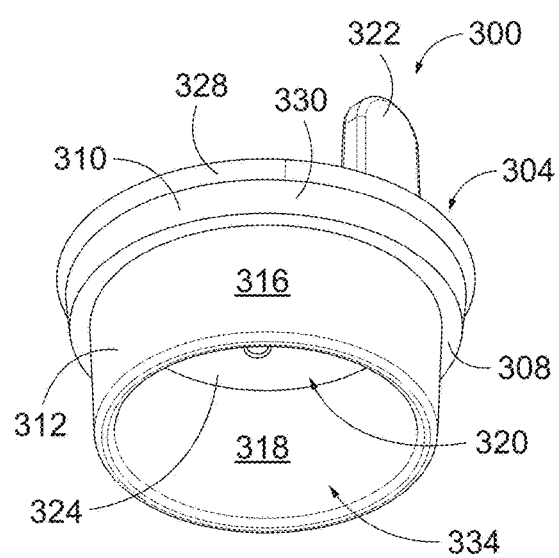

FIG. 3B is a bottom isometric view of the upper cover of the filter of FIG. 3A.

Figure 3C:
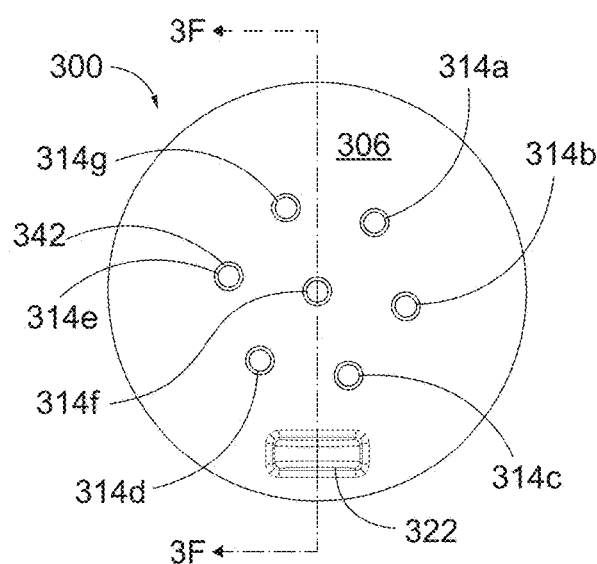

FIG. 3C is a top plan view of the upper cover of the filter of FIG. 3A.

Figure 3D:
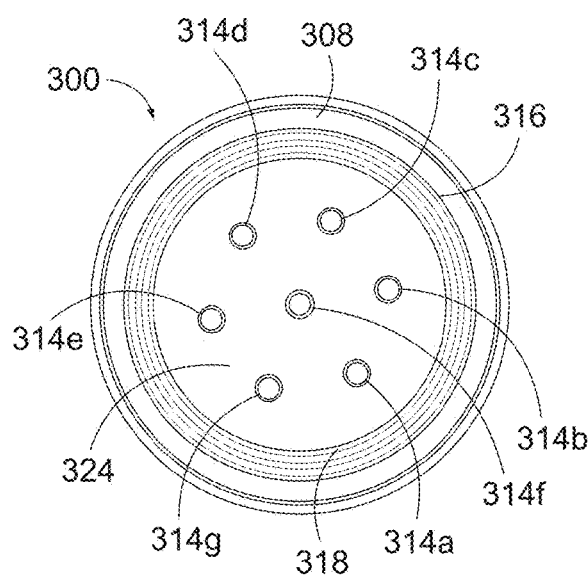

FIG. 3D is a bottom plan view of the upper cover of the filter of FIG. 3A.

Figure 3E:
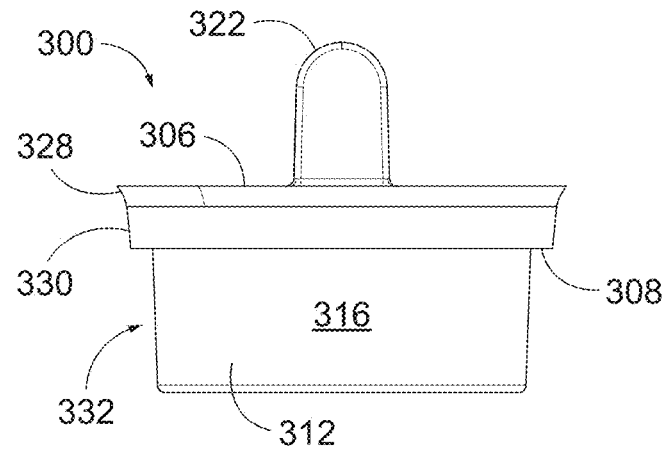

FIG. 3E is a side elevation view of the upper cover of the filter of FIG. 3A.

Figure 3F:
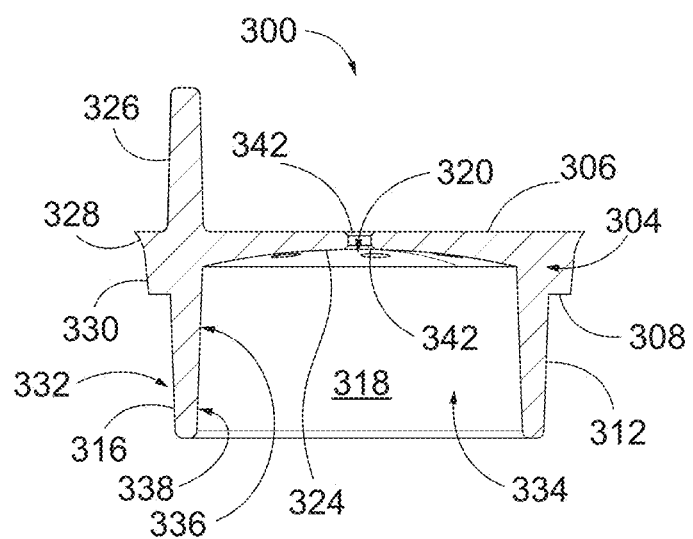

FIG. 3F is a cross section view of the upper cover of the filter of FIG. 3A taken along section line 3F-3F of FIG. 3C.

Figure 4A:
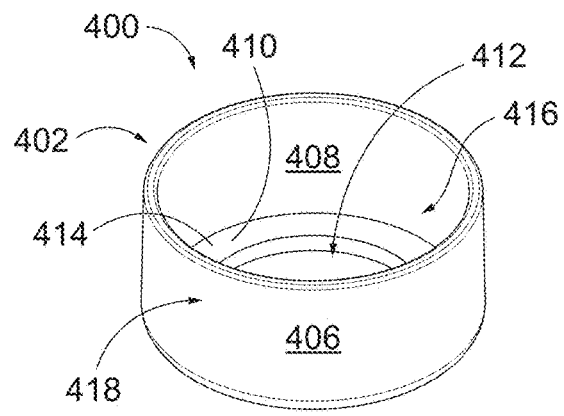

FIG. 4A is a top isometric view of a lower cover of the filter of FIG. 1A.

Figure 4B:
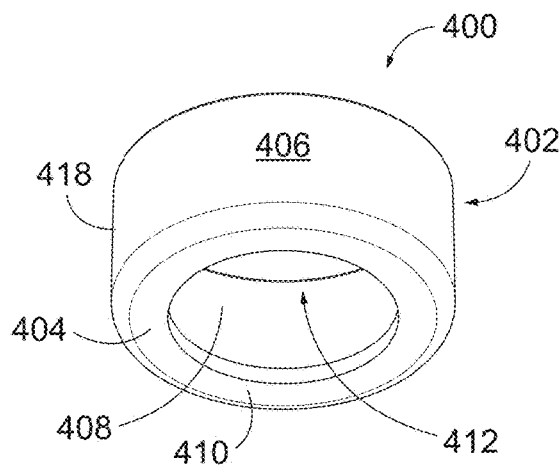

FIG. 4B is a bottom isometric view of the lower cover of the filter of FIG. 4A.

Figure 4C:
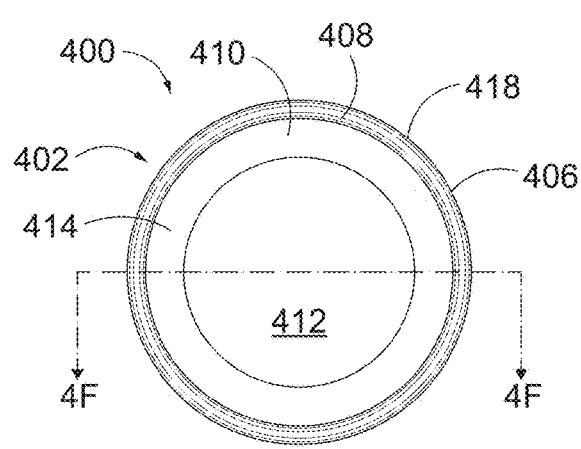

FIG. 4C is a top plan view of the lower cover of the filter of FIG. 4A.

Figure 4D:
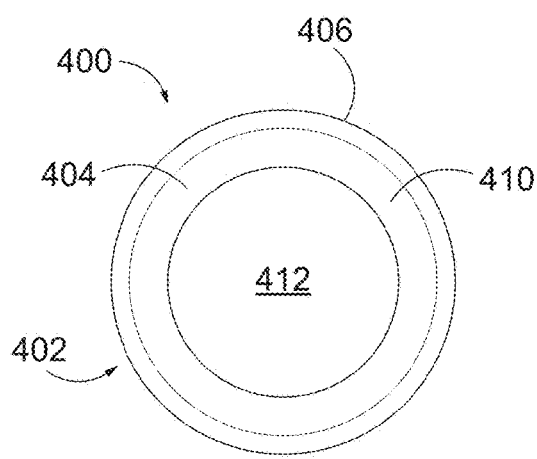

FIG. 4D is a bottom plan view of the lower cover of the filter of FIG. 4A.

Figure 4E:
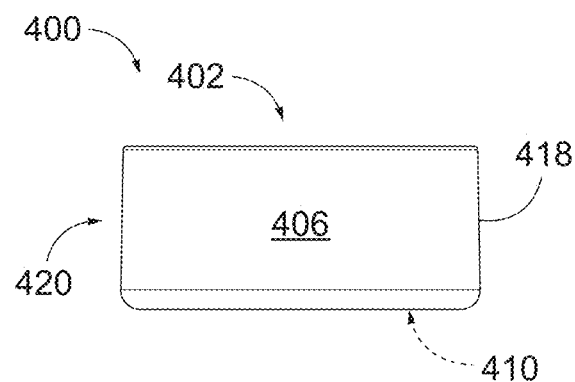

FIG. 4E is a side elevation view of the lower cover of the filter of FIG. 4A.

Figure 4F:
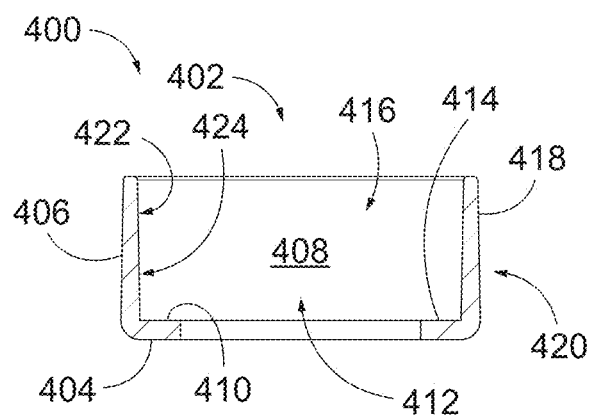

FIG. 4F is a cross section view of the lower cover of the filter of FIG. 4A taken along section line 4F-4F of FIG. 4C.

Figure 5:
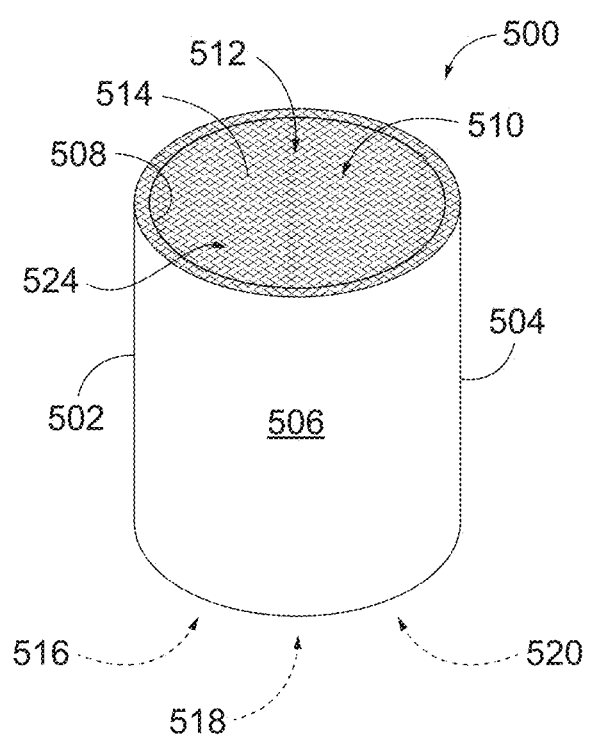

FIG. 5 is an isometric view of a filter media assembly of the filter of FIG. 1A.

Figure 6A:
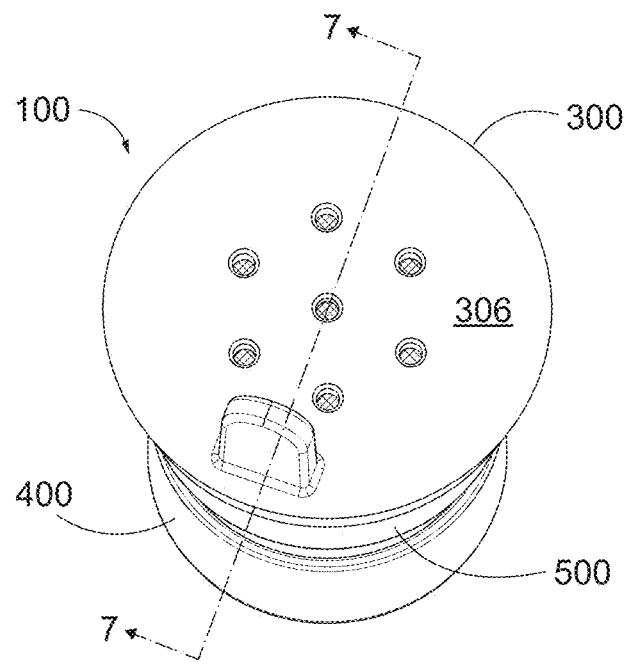

FIG. 6A is a top isometric view of the filter of FIG. 1A.

Figure 6B:
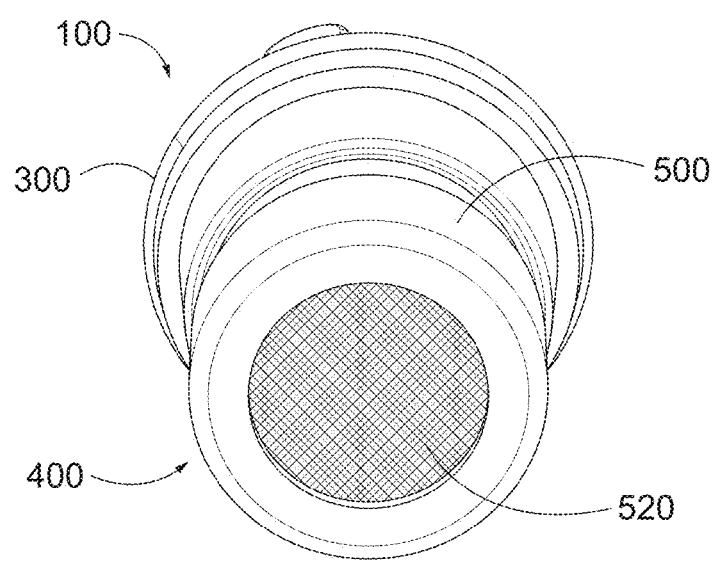

FIG. 6B is a bottom isometric view of the filter of FIG. 1A.

Figure 7:
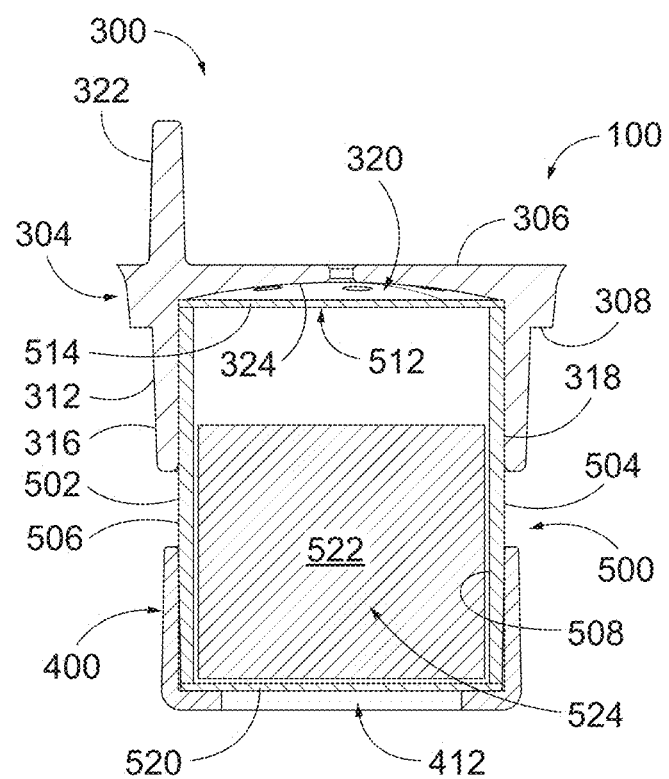

FIG. 7 is a cross section view of the filter of FIG. 1A taken along section line 7-7 of FIG. 6A.

Figure 8A:
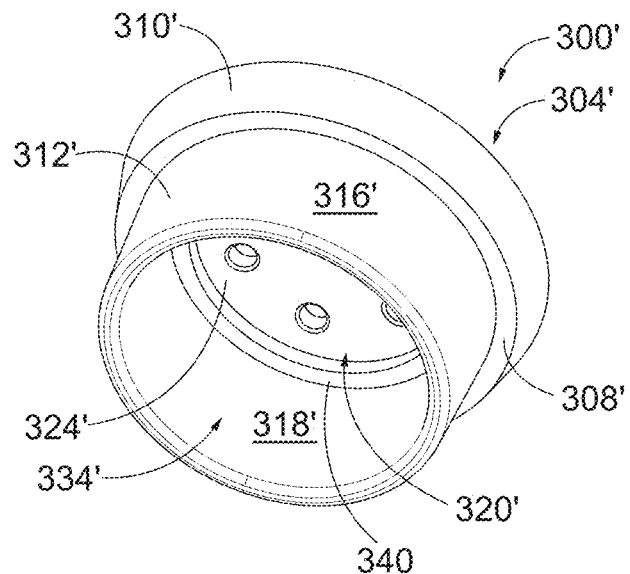

FIG. 8A is a bottom isometric view of an embodiment of an upper cover.

Figure 8B:
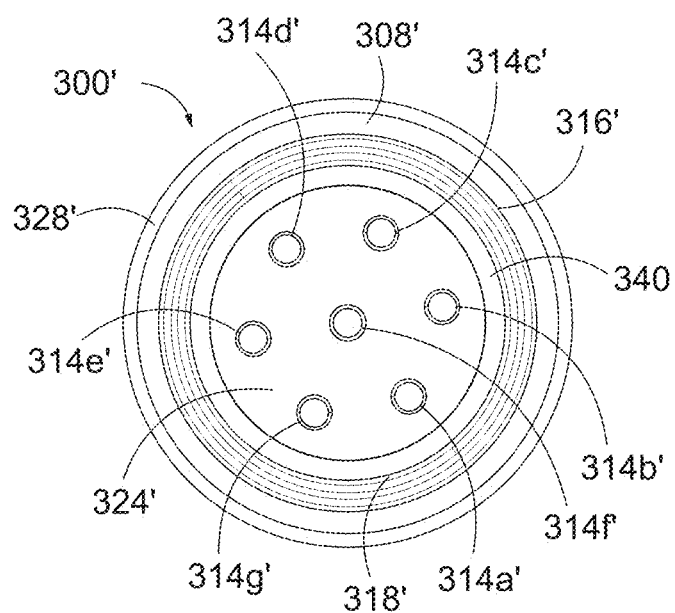

FIG. 8B is a bottom plan view of the upper cover of FIG. 8A.

Figure 9A:
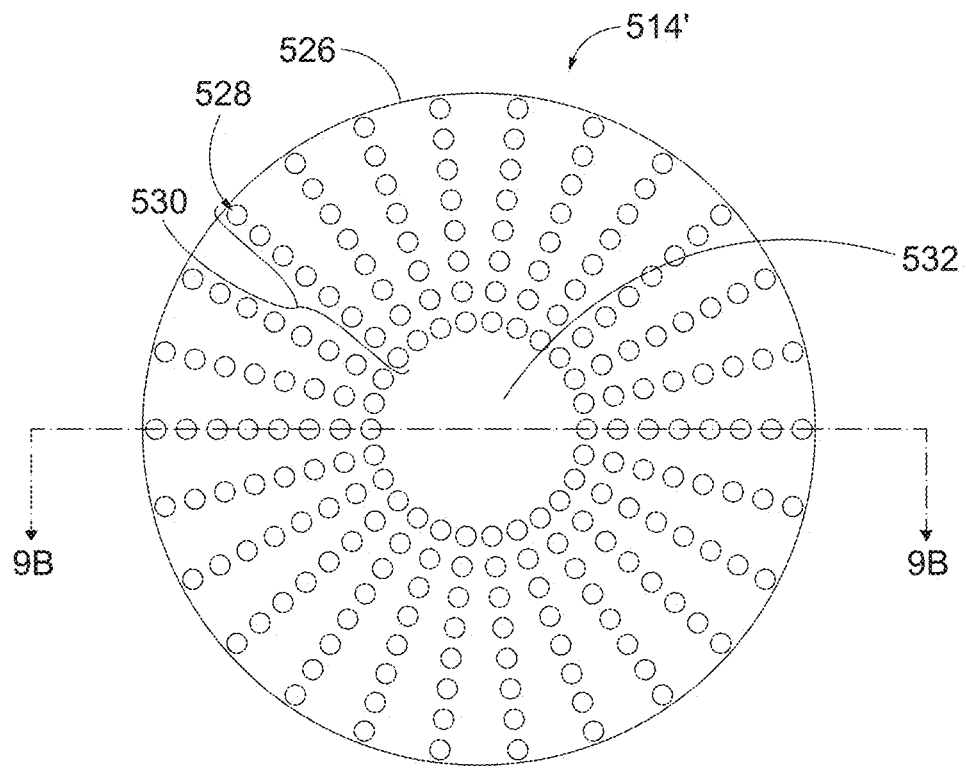

FIG. 9A is a lower plan view of a containment element suitable for use with the filter of FIG. 1A.

Figure 9B:

FIG. 9B is a section of the containment element of FIG. 9A taken along section line 9B-9B of FIG. 9A.

Figure 10:
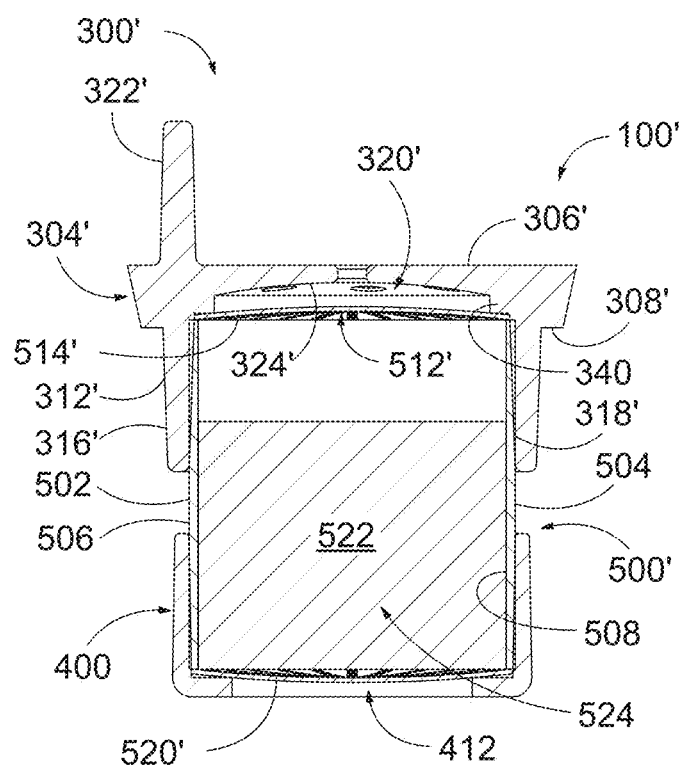

FIG. 10 is a cross section view of a filter with the upper cover of FIG. 8A and the containment element of FIG. 9A.

Figure 11:
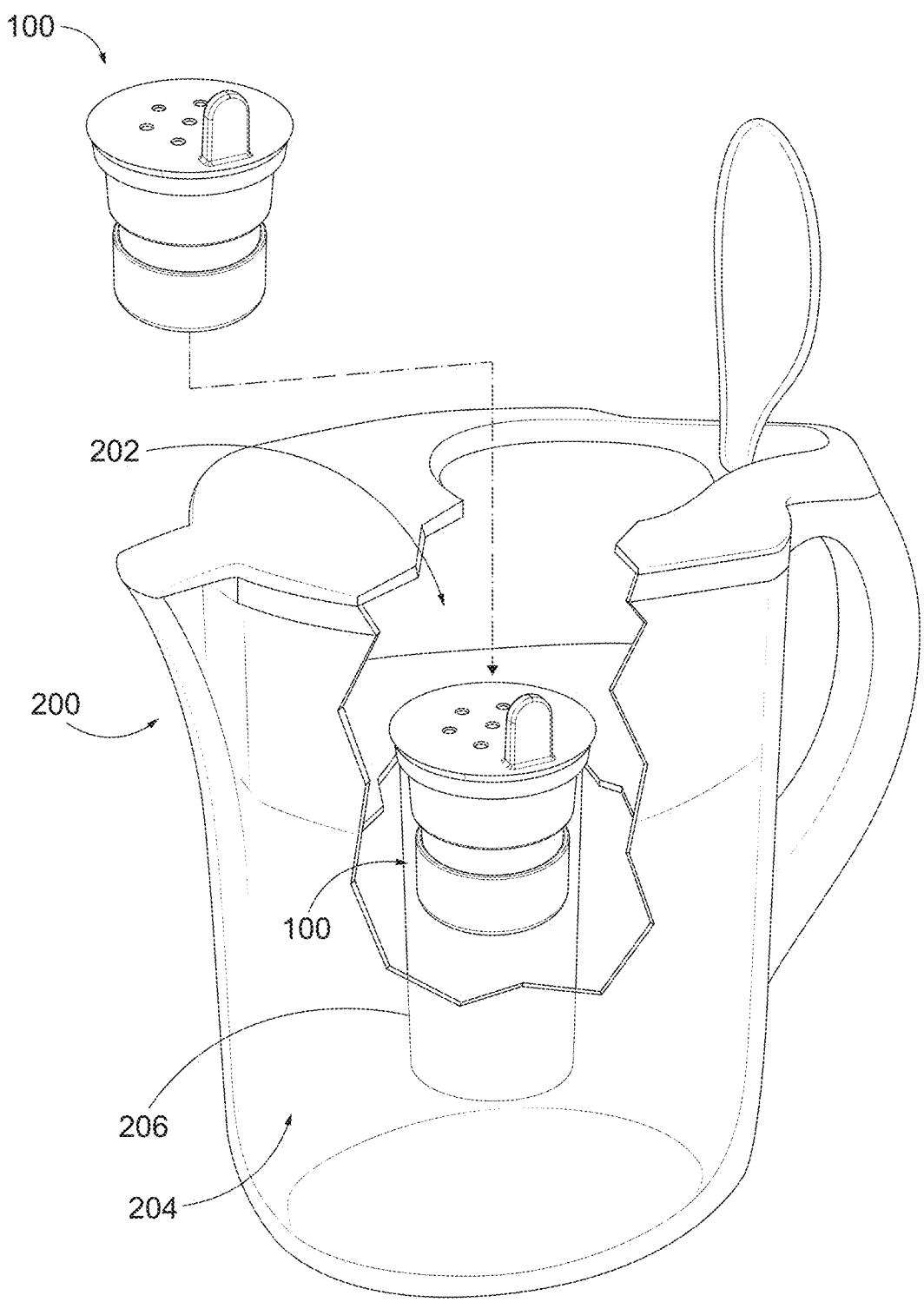

FIG. 11 is an isometric view of the filter of FIG. 1A used in a water pitcher.

DETAILED DESCRIPTION

The present disclosure provides for a water filter medium container with removable filter media, together forming a water filter. The filter media of the water filter is removable and replaceable, such as when the filter media reaches the end of its useful life. The water filter medium container may include an upper cover and a lower cover disposed on opposing ends of a filter media assembly. The upper and/or lower covers may be removable such as to allow access to remove and replace the filter media. In some embodiments, the water filter may be adapted to be received in a water pitcher, such that the water filter can filter water passing through an upper compartment of the filter pitcher into a lower compartment of the filter pitcher.

FIG. 1A-FIG. 2, show an example of a water filter 100. The water filter 100 includes an upper cover 300 and a lower cover 400 disposed at opposite ends of a filter media assembly 500. The upper cover 300 and the lower cover 400 contain a filter medium within the filter media assembly 500. The upper cover 300 includes one or more apertures that allow water or other fluids to flow into the filter media assembly 500 and into the filter medium to be filtered. The lower cover 400 includes an aperture to allow filtered water to flow out of the filter media assembly 500 and ultimately out of the water filter 100.

FIG. 3A-FIG. 3D illustrate an example of an upper cover 300 of the water filter 100. The upper cover 300 includes a main body 304. The main body 304 includes an upper face 306. As shown, the upper face 306 may be substantially planar. In some embodiments, the upper face 306 may have other shapes such as concave, convex, patterns, or the like. Opposing the upper face 306 is an inner blind face 324 on an opposite, lower end of the main body 304 from the upper face 306. In the example shown, the inner blind face 324 may have a concave profile (see, e.g., FIG. 3F). In some embodiments, the inner blind face 324 may have other suitable profiles such as planar, convex, patterned, or the like.

A circumferential wall 312 extends around the circumference of the main body 304. The circumferential wall 312 may have a stepped profile (see, e.g., FIG. 3E and FIG. 3F). For example, a first circumferential portion 310 forming an upper part of the circumferential wall 312 may be thicker than a second circumferential portion 316 forming a lower part of the circumferential wall 312. An upper section 328 of the first circumferential portion 310 may extend radially outward to form a flange of greater diameter than a diameter of a lower portion 330 of the first circumferential portion 310. Thicknesses of either or both of the upper portion 328 and/or lower portion 330 may be tapered such that the respective upper portion 328 and lower portion 330 are wider near the top of the portion than they are at the bottom of the portion.

A second circumferential portion 316 of the circumferential wall 312 extending below the first circumferential portion 310 may have a width dimension (i.e., an outer diameter) smaller than that of the first circumferential portion 310. The second circumferential portion 316 may be tapered. For example, the second circumferential portion 316 may have an outer surface 332 such that the second circumferential portion 316 has a width dimension (i.e., outer diameter) at an upper portion of the outer surface 332 that is greater than a width dimension (i.e., outer diameter) of the outer surface 322 at a lower portion. In some embodiments, the second circumferential portion 316 may be substantially cylindrical.

The circumferential wall 312 defines a generally cylindrical inner cavity or receptacle 334 bounded by an inner surface 318. The inner surface 318 may have a width dimension (i.e., inner diameter) that is smaller than a width dimension (i.e., outer diameter) of the outer surface 332. In the example shown, the inner surface 318 defines a taper. For example, the second circumferential portion 316 may have a width dimension (i.e., inner diameter) at an upper portion 336 of the inner surface 318 that is smaller than a width dimension (i.e., inner diameter) at a lower portion 338 of the inner surface 318. In some embodiments, the inner surface 318 may be a cylindrical profile.

A flange surface 308 extends laterally between the first circumferential portion 310 and the second circumferential portion 316. In some embodiments, the flange surface 308 may be substantially parallel to the upper face 306. In some embodiments, the flange surface 308 may extend at an angle relative to the upper face 306, such as toward the upper face 306 as the flange surface 308 extends between the first circumferential portion 310 and the second circumferential portion 316 of the circumferential wall 312.

The main body 304 may include one or more apertures formed therein to enable the flow of water or other fluids therethrough. For example, an inlet aperture 314a may be formed in the main body 304 and pass between the upper face 306 and the inner blind face 324. More than one inlet aperture may be used, as desired, for example, to achieve a certain fluid flow rate or volume through the upper cover 300. For example, as shown, an array 302 formed by a plurality of inlet apertures 314a-314g may be formed in the main body 304 passing between the upper face 306 and the inner blind face 324. The inlet apertures 314a-314g may be disposed in any suitable pattern and/or quantity. For example, although seven inlet apertures are shown, more or fewer apertures such as 6 or fewer or 8 or more inlet apertures may be used. Although shown as round apertures, the inlet apertures may be any suitable shape, such as a polygon, a slot, an irregular shape, or combinations thereof. For example the array 302 may include an aperture of a certain shape (e.g. round) and another aperture of a different shape (e.g., slots, words, letters, symbols, polygons, etc.). In some examples, the inlet apertures may be about 0.15 inches in diameter. In some embodiments, one or more inlet apertures 314 may include a chamfered edge 342 on an upper and/or lower edge. The chamfered edges 342 may improve a flow rate of a fluid passing through the water filter.

A handle 322 may extend from a portion of the upper cover 300. For example, as shown, the handle 322 extends longitudinally from the upper face 306. The handle 322 may be a thin tab with a rounded upper section. The handle 322 may be adapted to be grasped by a user's fingers or a tool.

The handle 322 may be used to remove the water filter 100 from a water pitcher. The handle 322 may also be used to separate the upper cover 300 from the balance of the water filter 100 such as to replace the water filter medium 522 as discussed below. Other suitable shapes for the handle 322 may be used that enable the manipulation of the upper cover 300.

In a preferred embodiment, the upper cover 300 may be formed of an elastomer such as silicone. In some embodiments, other materials may be used, such as other elastomers like rubber, EPDM, nitrile, and the like. In some embodiments, the upper cover 300 may be formed of plastic, metal, composites and/or combinations of these materials. In some embodiments, the upper cover 300 may be cast, molded, machined, additively manufactured, or otherwise formed as a single, unitary part. In other examples, the upper cover 300 may be formed from two or more parts. For example, a rigid metal or plastic piece may form the main body 304 onto which an elastomeric seal portion 312 may be coupled such as by over-molding or the like.

FIG. 4A-FIG. 4F illustrate an example of a lower cover 400 of the water filter 100. FIG. 4C shows the lower cover as viewed from above as the lower cover would be oriented when assembled with the balance of the filter 100. FIG. 4D shows the lower cover a viewed from below. The lower cover 400 includes a main body 402. The main body 402 may have a generally cylindrical outer profile. The main body 402 has a circumferential wall 418 that extends longitudinally from and transverse to an internal flange 410 that correspondingly extends radially inwardly from one end of the circumferential wall 418. The internal flange 410 may have a lower face 404 and an inner blind face 414 opposing the lower face 404. As shown, the lower face 404 may be substantially planar. In some embodiments, the lower face 404 may have other shapes such as a concave, convex, patterns, or the like. In the example shown, the inner blind face 414 may have a planar profile (see, e.g., FIG. 4F). In some embodiments, the inner blind face 414 may have other suitable profiles such as planar, convex, patterned, or the like. The circumferential wall 418 has an inner surface 408 disposed inwardly from an outer surface 406. The inner surface 408 defines a receptacle 416 within the main body 402. The outer surface 406 has an outer width dimension (i.e., outer diameter) that is larger than the width dimension (i.e., inner diameter) of the inner surface 408.

The outer circumferential face 406 may have a tapered profile (see, e.g., FIG. 4E and FIG. 4F). For example, the outer diameter 420 of the outer surface 406 may be narrower at an upper portion than at a lower portion of the outer surface 406. In some embodiments, thicknesses of either or both of the upper portion and/or lower portion of the circumferential wall 418 may be tapered such that the respective upper portion 422 and lower portion 424 are wider near the bottom of the respective portion than they are at the top of the portion.

In the example shown, the inner surface 408 may have a tapered profile. For example, as shown in FIG. 4F, the inner surface 408 may have an upper portion 422 and a lower portion 424 disposed below the upper portion 422. The upper portion 422 may have a wider width dimension (i.e., inner diameter) than a width dimension (i.e., inner diameter) of the lower portion 424. In some embodiments, the upper portion 422 may blend smoothly to the lower portion 424. In some embodiments, the inner surface 408 may have a substantially cylindrical profile or may be tapered.

An aperture 412 is formed in the main body 402 between the lower face 404 and the inner blind face 414. The aperture 412 may be suitable to allow the passage of a fluid, such as water, therethrough. The main body 402 may include more than one aperture 412 formed therein to enable the flow of water or other fluids therethrough, for example to achieve a certain fluid flow through the lower cover 400. Although shown as a round aperture, the aperture 412 may be any suitable shape, such as a polygon, a slot, an irregular shape, or combinations thereof. Apertures 412 may be disposed in any suitable pattern and/or quantity.

The lower cover 400 may be formed of similar materials and by similar methods as the upper cover 300, which are not repeated for brevity.

FIG. 5 shows an example of a filter media assembly 500. The filter media assembly 500 includes a tube 502, one or more containment elements such as an upper containment element 514 and a lower containment element 520, and a filter medium 522.

The tube 502 may be a substantially hollow cylindrical body 504 with an outer surface 506 and an opposing inner surface 508. The inner surface 508 defines a filter medium compartment 524 suitable to receive a filter medium 522 (see FIG. 7). The body 504 may have an upper open end 510 and a lower open end 516. The upper open end 510 may define an inlet 512. The lower open end 516 may define an outlet 518. The inlet 512 and outlet 518 are in fluid communication with the filter medium compartment 524. The example of the tube 502 shown is symmetrical between its top and bottom such that the references to upper and lower or inlet and outlet are descriptive only and in no way limiting. For example, the tube 502 may be inverted such that the upper and lower portions and openings are swapped. In other embodiments, the upper and lower portions of the tube may not be symmetrical, such as when a lower portion is keyed to be accepted into a given water pitcher.

The tube 502 may be made of any suitable material that can contain the filter medium 522 and can accept the upper cover 300 and lower cover 400 as described below. In one embodiment, the tube 502 is formed of a metal such as stainless steel. In some embodiments, the tube 502 is formed from plastic, composite materials, other metals, or combinations thereof. In some embodiments, the tube may have a rigid core with an elastomeric over-mold. In some embodiments, the tube may have other cross sections than that of a circle. For example, the tube 502 may have a polygonal cross section or an irregular cross section, for example to adapt the tube 502 to be used in different water pitchers.

The upper containment element 514 and lower containment element 520 along with the body 504 of the tube 502 contain the filter medium 522 within the filter medium compartment 524. The upper containment element 514 may be arranged proximate to the upper open end 510 of the tube 502. The lower containment element 520 may be arranged proximate to the lower open end 516 of the tube 502. The upper containment element 514 and the lower containment element 520 may overlap the inner surface 508 and extend to a diameter congruent with the diameter of the outer surface 506 of the tube 502.

The containment elements are sufficiently porous to allow a fluid, such as water, to pass through but prevent or limit the amount or size of particles of the filter media 522 that can pass therethrough. In some embodiments, one or both of upper containment element 514 and the lower containment element 520 are a screen, woven fabric, felt, porous membrane, combinations thereof, or the like. The upper containment element 514 and the lower containment element 520 may be formed of the same or of different materials. In some embodiments, the upper containment element 514 and/or lower containment element 520 may be metal (e.g., stainless steel) screens. The containment elements may also serve to filter particulate matter from a fluid passing therethrough. For example, the containment elements may filter dirt, silt, pollen, or the like from water passing through the water filter 100. In some embodiments, the upper containment element 514 and/or lower containment element 520 may be a felt material such as a polypropylene felt. In some embodiments, more than one upper containment element 514 and/or more than one lower containment element 520 may be used. For example, a first upper containment element 514 like a wire mesh and a second upper containment element 514 like a felt material may be used.

The filter medium 522 may be any suitable medium that will remove the desired contaminants. In many examples, the filter media 522 is a form of carbon, such as granular activated carbon, charcoal, or the like. In some examples, the filter media 522 includes carbon-based materials having more than one particle size. Other filter media 522 may be used, as desired, such as ion exchange media, sorbents, particulate filters and/or combinations of these.

FIGS. 1A, 1B, 6A, 6B, and 7 show an example of an assembled water filter 100. To assemble the water filter 100, using one exemplary methodology, the lower containment element 520 may be placed in the lower cover 400 against the inner blind face 414. The tube 502 may then be inserted into the receptacle 416 of the lower cover 400 such that edge forming the lower open end 516 of the tube 502 traps the lower containment element 520 against the inner blind face 414. The taper of the inner surface 408 may ease assembly of the lower cover 400 to the tube 502. For example, the upper portion 422 may act as a guide to initially accept the tube 502, while the lower portion 424 may form a seal with the outer surface 506 of the tube 502 as the tube 502 is inserted more deeply into the receptacle 416 of the lower cover 400. Thus, the lower containment element 520 may be secured against the tube 502 with the lower cover 400.

The filter medium compartment 524 in the tube 502 may then be filled with a filter medium 522. For example, a solid charcoal stick may be placed within the compartment 524. In other embodiments, a granular carbon may be poured into the filter medium compartment 524 through the upper open end 510 or the lower open end 516 of the tube 502. In some examples, the tube 502 may be shaken or vibrated as the filter medium 522 is placed in the filter medium compartment 524, for example to pack more filter medium 522 into the filter medium compartment 524.

The upper containment element 514 may be placed in the receptacle 334 the upper cover 300 against the inner blind face 324. The receptacle 334. The upper cover 300 may be placed over the upper open end 510 of the tube 502 such that edge forming the upper open end 510 of the tube 502 traps the upper containment element 514 against outer edge of the inner blind face 324 of the upper cover 300. Additionally, in the embodiment shown, a plenum 320 is formed between the concave surface of the inner blind face 324 of the upper cover 300 and the upper containment element 514. The taper of the inner surface 318 may ease assembly of the upper cover 300 to the tube 502. For example, the upper portion 338 may act as a guide to initially accept the tube 502, while the upper portion 336 may form a seal with the outer surface 506 of the tube 502 as the tube 502 is inserted more deeply into the receptacle 336 of the upper cover 300. The water filter 100 may be assembled in other orders than as described. For example, the upper cover 300 and upper containment element 514 may be attached to the tube 502 first, the filter media 522 may be placed within the tube 502, and then the lower cover 400 and lower containment element 520 may be attached to the opposing end of the tube.

FIGS. 8A and 8B show an alternate embodiment of an upper cover 300'. The upper cover 300' may be similar to the upper cover 300 in some aspects. For example, the upper cover 300' may include one or more inlet apertures 314a'-315g'. The upper cover 300' may include a first circumferential portion 310' and a second circumferential portion 316'. In the example shown, the first circumferential portion 310' has a smoothly tapered profile such that the upper portion of the first circumferential portion 310' has the same taper as the lower portion. In some embodiments the upper cover 300' may be a first circumferential portion 310' as described with respect to the upper cover 300'. A receptacle 334' may be formed within the upper cover 300'. The upper cover 300' may have a step 340 extending longitudinally into the receptacle 334' from the inner blind face 324'. The step 340 may extend around a circumference of the inner surface 318' and/or a circumference of the inner blind face 324'. The step 340 may transition from an inner diameter of the receptacle 334' adjacent to the inner blind face 324' to an inner diameter adjacent the inner surface 318'.

FIGS. 9A and 9B show an embodiment of a containment element. The containment element shown in FIGS. 9A, 9B may be used as an upper containment element 514' and/or a lower containment element 520'. While the following description is of an upper containment element 514', a lower containment element 520' may have a similar or identical structure and function, repetition of which is omitted. In the example shown, the containment element 514' may be formed from a curved disc 526 (see, e.g., FIG. 9B). In other embodiments, the disc 526 may be planar, patterned, of have other suitable shapes. The disc 526 may have one or more apertures 528 defined therethrough, such as to allow the passage of a fluid such as water. In the example shown, the apertures 528 are arranged in one or more lines 530 that are aligned with respective radii of the disc 526. Lines 530 of apertures 528 may be arranged along radii of the disc 526 at regularly-spaced angles around the disc 526. In other embodiments, apertures 528 may be arranged in other suitable patterns, or may be arranged without a pattern (e.g., randomly). The containment element 514' may have a blind portion 532 in the disc that does not contain apertures 528. In the example shown, the disc 526 includes a blind portion 532 in the center of the disc 526. A blind portion 532 may be placed elsewhere in the disc 526 as desired.

FIG. 10 shows a cross section (taken from the same point of view as the cross section of FIG. 7) of a filter 100' formed with the upper cover 300' and the containment elements 514', 520' of FIGS. 8A/8B and 9A/9B, respectively. The filter 100' may be assembled and function as previously described with respect to the filter 100', in some aspects. As shown in FIG. 10, the step 340 may help to hold the containment element 514' to the tube 502. The step 340 may also form a seal with the containment element 514'. In the embodiment of the filter 100' shown, a plenum 320' is formed between the concave surface of the inner blind face 324' of the upper cover 300' and the upper containment element 514'. The plenum 320' may function similar to the plenum 320 of the filter 100 such as to slow or spread out a fluid flow across the filter medium 522. in this embodiment, the blind portion 532 may create a stagnation point in a fluid flow within the filter 100' that pushes fluid toward the outer portions of the filter medium 522, such as to reduce or eliminate a channel of fluid forming in the center of the filter medium 522, thereby providing better filtration and/or longer filter life. A blind portion 532 of a lower containment element 520' may also serve to reduce or eliminate fluid channels forming in the filter medium 522.

FIG. 11 shows a water filter 100 (or 100') in use with a water container 200. The water container 200 includes an unfiltered water compartment 202 and a filtered water compartment 204. The unfiltered water compartment 202 and filtered water compartment 204 are in fluid communication with one another via a receiver 206. The receiver 206 is suitable to accept a water filter 100 (or 100"). The taper of the second circumferential portion 316 of the circumferential wall 312 may help to form a seal with the receiver 206 to limit or prevent unfiltered water from bypassing the water filter 100 into the filtered water compartment 204. Similarly, the profile of the first circumferential portion 310 may help form such a seal. For example, the circumferential wall 312 of the water filter 100 may be flexible such that the circumferential wall 312 may be wedged or otherwise form a press fit into the receiver 206 to form a tight seal. Similarly, the flange surface 308 may help to form such a seal.

A fluid such as water maybe placed into the unfiltered water compartment 202. The fluid may drain by gravity through the array 302 of inlet apertures 314a-314g. As shown in FIG. 7, the water may then enter the plenum 320 formed between the inner blind face 324 of the upper cover 300 and the upper containment element 514. A benefit of the plenum 320, is that the fluid flow may spread out across the inlet 512 in the plenum, such that slows down relative to its speed through the inlet apertures and may flow uniformly across the filter medium 522. Without the plenum 320, the inlet apertures of the array 302 may form distinct fluid jets that form channels in the filter medium 522, thereby decreasing contact time and area with the filter medium 522 which may lead to a decrease in the useful life of the filter medium 522 and/or decreased filtering performance. The fluid may flow through the filter medium 522 and the filter media 522 may remove certain contaminants from the fluid. The fluid may exit the filter media assembly 500 via the outlet 518, passing through the lower containment element 520, through the aperture 412 in the lower cover 400, and into the filtered water compartment 204. When the filter medium 522 is spent or has otherwise reached the end of its useful life, the water filter 100 may be removed from the water container 200 by grasping the handle 322 and withdrawing the water filter 100 from the receiver 206. The water filter 100 may be disassembled in a reverse order from assembly, the spent filter media 522 removed, fresh filter media 522 added, re-assembled and placed back in the water container 200.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A reusable water filter medium container comprising
a tube comprising an outer surface, an upper open end defining an inlet and a lower open end defining an outlet;
an upper cover removably coupled to the tube to cover the upper open end, the upper cover including a first main body with one or more inlet apertures formed therethrough and forming an upper receptacle therein to receive a first portion of the tube, the upper receptacle defined at least partially by a first surface that forms a first seal with the outer surface of the tube;

a lower cover removably coupled to the tube to cover the lower open end, the lower cover including a second main body with an outlet aperture therethrough and forming a lower receptacle therein to receive a second portion of the tube, the lower receptacle defined at least partially by a second surface that forms a second seal with the outer surface of the tube;

a filter medium assembly including
the tube;
a first screen secured within the upper receptacle and positioned adjacent the inlet of the tube;
a second screen secured within the lower receptacle and positioned adjacent the outlet of the tube; and
a filter medium, wherein the tube, the first screen, and the second screen contain the filter medium within a filter medium compartment;
wherein at least one of the upper cover or the lower cover is removable from the tube to allow selective replacement of the filter medium when the filter medium is spent.

2. The water filter medium container of claim 1, wherein the upper cover includes an upper face and an opposing inner face and the one or more inlet apertures pass between the upper face and the inner face.

3. The water filter medium container of claim 2, wherein the inner face has a convex profile.

4. The water filter medium container of claim 3, wherein the convex profile forms a plenum between the inner face and the first screen.

5. The water filter medium container of claim 4, wherein the plenum is operative to decrease a speed of a fluid passing though the filter medium relative to a speed of the fluid passing through the one or more inlet apertures.

6. The water filter medium container of claim 4, wherein the plenum is operative to cause the fluid to flow uniformly across the filter medium.

7. The water filter medium container of claim 4, wherein the first screen includes a blind portion that forms a fluid stagnation point within the plenum, and
the fluid stagnation point is operative to further cause the fluid to flow uniformly across the filter medium.

8. The water filter medium container of claim 1, wherein the first main body of the upper cover includes an outer circumferential face that extends around a circumference of the first main body;
the outer circumferential face includes an upper portion and a lower portion; and
the outer circumferential face has a larger width dimension at the upper portion than at the lower portion.

9. The water filter medium container of claim 8, wherein the upper cover includes a seal portion;
the seal portion forms an inner circumferential face of the first main body;
the inner circumferential face includes an upper portion of the inner circumferential face and a lower portion of the inner circumferential face; and
the inner circumferential face is tapered such that the upper portion has a width dimension that is greater than a width dimension of the lower portion.

10. The water filter medium container of claim 9, wherein the tapered inner circumferential face is operative to be received in a receiver of a water container to form a seal therewith.

11. The water filter medium container of claim 10, wherein outer circumferential face is flexible such that the seal forms a press fit seal.

12. The water filter medium container of claim 9, wherein the taper of the inner circumferential face is operative to facilitate the receipt of the first portion of the tube in the upper receptacle.

13. The water filter medium container of claim 1, wherein one of the first screen or the second screen comprises a felt or a mesh.

14. The water filter medium container of claim 1, wherein
the first screen comprises a first plurality of apertures;
the second screen comprises a second plurality of apertures; and
the first plurality of apertures, the second plurality of apertures, or both, are smaller than a particle size of filter medium.

15. The water filter medium container of claim 1, wherein the upper cover includes a handle extending from an upper face operative to remove the water filter from a receiver of a water container.

16. The water filter medium container of claim 1, wherein the filter medium is a carbon-based material.

17. The water filter medium container of claim 16, wherein the filter medium comprises carbon-based material having more than one particle size.

18. The water filter medium container of claim 1, wherein at least one of the upper cover or the lower cover is formed of an elastomeric material.

19. The water filter medium container of claim 18, wherein the elastomeric material is silicone.

20. The water filter medium container of claim 1, wherein the tube is stainless steel.

21. The water filter medium container of claim 1, wherein the one or more inlet apertures include a chamfered edge configured to improve a flow rate of a fluid passing through the water filter medium container.

22. A system including
the water filter medium container of claim 1;
a water container, wherein the water container includes
an unfiltered water compartment;
a filtered water compartment; and
a receiver in fluid communication between the unfiltered water compartment and the filtered water compartment, the receiver operative to receive the water filter medium container; wherein
a fluid placed in the unfiltered water compartment passes through the water filter medium container and the filter medium to the filtered water compartment.

23. The water filter medium container of claim 1, wherein
the upper cover comprises a first inner blind face, and the lower cover comprises a second inner blind face;
the tube comprises an upper edge and a lower edge;
the upper edge traps the first screen against the first inner blind face; and
the lower edge traps the second screen against the second inner blind face.

24. The water filter medium container of claim 1, wherein
the first screen is a first disc positioned in a first fluid pathway between the one or more inlet apertures and the inlet of the tube; and
the second screen is a second disc positioned in a second fluid pathway between the outlet of the tube and the outlet aperture.

25. The water filter medium container of claim 1, wherein the first surface and the second surface form respective seals with an outer surface of the tube as the tube is inserted into the upper receptacle and the lower receptacle.

* * * * *